US008877848B1

(12) United States Patent
Wang et al.

(10) Patent No.: US 8,877,848 B1
(45) Date of Patent: Nov. 4, 2014

(54) AQUEOUS VIBRATION DAMPING COMPOSITIONS

(71) Applicant: PPG Industries Ohio, Inc., Cleveland, OH (US)

(72) Inventors: Wei Wang, Allison Park, PA (US); Tien-Chieh Chao, Mars, PA (US); Umesh C. Desai, Wexford, PA (US); David Fenn, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/951,811

(22) Filed: Jul. 26, 2013

(51) Int. Cl.
| G10K 11/165 | (2006.01) |
| C09D 5/02 | (2006.01) |
| C08K 5/05 | (2006.01) |
| C08K 3/00 | (2006.01) |
| C08K 5/04 | (2006.01) |

(52) U.S. Cl.
CPC .............. G10K 11/165 (2013.01); C09D 5/024 (2013.01); C08K 5/05 (2013.01); C08K 3/0033 (2013.01); C08K 5/04 (2013.01)
USPC ............ 524/425; 524/386; 524/423; 524/445

(58) Field of Classification Search
CPC .......... C08K 3/0033; C08K 5/05; C08K 5/04; C09D 5/024
USPC .................................. 524/425, 386, 423, 445
See application file for complete search history.

(56) References Cited

U.S. PATENT DOCUMENTS

| 5,066,708 A | 11/1991 | Koller, Sr. et al. |
| 5,356,956 A | 10/1994 | Uemae et al. |
| 7,176,258 B2 | 2/2007 | Morihiro et al. |
| 2008/0039564 A1* | 2/2008 | Desai et al. ................... 524/386 |
| 2009/0048357 A1 | 2/2009 | Yasui et al. |

FOREIGN PATENT DOCUMENTS

| CA | 2118754 A1 | 9/1994 |
| CN | 102443332 A * | 11/2013 |
| EP | 0 507 634 B1 | 9/1995 |
| EP | 1 520 865 B1 | 5/2009 |
| EP | 1 926 778 B1 | 12/2010 |
| JP | 08-231731 | 9/1996 |
| JP | 2001 152028 A | 6/2001 |
| JP | 3942284 B2 | 7/2007 |
| JP | 4416473 B2 | 2/2010 |

OTHER PUBLICATIONS

Cheng Xu et al., "Dynamic Mechanical Study on Multilayer Core-Shell Latex for Damping Applications", Progress in Organic Coatings 74 (2012) 233-239.
R. Hu et al., Multicomponent Latex IPN Materials. I. Morphology Control, 1997 John Wiley & Sons, Inc., pp. 2193-2206.

* cited by examiner

*Primary Examiner* — Michael M Bernshteyn
(74) *Attorney, Agent, or Firm* — William J. Uhl

(57) ABSTRACT

The present invention provides an aqueous polymer dispersion for vibration damping comprising a film-forming polymer in the form of dispersed particles comprising a polymer phase P1 and different polymer phases P2 and P3; the polymer dispersion obtained by free radical emulsion polymerization. Controlling the difference in glass transition temperatures of the polymers in the various polymer phases results in effective sound damping as determined by a Damping Loss Factor of at least 0.1 over a temperature range of at least 40° C. determined at a frequency of 200 Hz over a temperature range of −10 to 65° C. Use of a chain transfer agent in the polymerization of the various monomer charges results in good appearance in the resultant vibration damping coating.

13 Claims, No Drawings

AQUEOUS VIBRATION DAMPING COMPOSITIONS

FIELD OF THE INVENTION

The present invention relates to aqueous coating compositions with vibration damping properties.

BACKGROUND OF THE INVENTION

Vibration damping coating compositions are applied to automobile floor pans, deck lids and doors to damp or reduce road and engine noise and vibration. It is desirable that the sound damping coating be effective over a wide temperature range from −10 to 65° C. Most vibration damping compositions are effective over a relatively narrow temperature range, typically from 20 to 40° C.

For environmental reasons, aqueous coating compositions have been developed for such applications. However, since water is released from the coating composition upon drying or curing, the coating may shrink and may result in rough, uneven and cracked surfaces. Adjusting the filler content to improve appearance may adversely affect sound damping properties and/or adhesion of the coating composition to the substrate. Plasticizers may improve appearance, but performance in this regard is not consistent. Thus, there is a need in the art for an aqueous coating composition that exhibits sound damping properties over a broad temperature range and has good appearance.

SUMMARY OF THE INVENTION

The present invention provides an aqueous polymer dispersion for vibration damping comprising a film-forming polymer in the form of dispersed particles comprising a polymer phase P1 and different polymer phases P2 and P3; the polymer dispersion obtained by free radical emulsion polymerization comprising the following steps:
  (a) polymerization of a first monomer charge M1 to give a polymer phase P1 followed by
  (b) polymerization of a second monomer charge M2 in the presence of P1 to give a polymer phase P2,
  (c) polymerization of a third monomer charge M3 in the presence of P1 and P2 to give a polymer phase P3,
wherein a chain transfer agent is used in the polymerization of the monomer charges M1 M2 and M3 and the difference in the glass transition temperatures of P1 and P2 is at least 20° C. and the difference in glass transition temperatures of P2 and P3 is at least 5° C.

Controlling the difference in glass transition temperatures and molecular weights of the polymers by the use of a chain transfer agent in the various polymer phases results in effective sound damping as determined by a Damping Loss Factor of at least 0.1 over a temperature range of at least 40° C. determined at a frequency of 200 Hertz (Hz) over a temperature range of −10 to 65° C. and results in good appearance in the resultant vibration damping coating.

DETAILED DESCRIPTION

The polymer phases P1, P2 and P3 have different glass transition temperatures. Accordingly, the glass transition temperature of P1 can range from −40 to 130° C. The glass transition temperature of P2 can range from −40 to 130° C. and the glass transition temperature of P3 can range from −10 to 70° C. The difference in the glass transition temperatures between P1 and P2 is at least 20, such as 70 to 150° C. Further, the difference in glass transition temperatures between P2 and P3 is at least 5, such as 5 to 70° C. If the glass transition temperature of P1 is greater than P2, then the glass transition temperature of P3 should be greater than P2. Conversely, if the glass transition temperature of P1 is less than P2, the glass transition temperature of P2 should be greater than P3. Usually, the glass transition temperature of P1>P2<P3 with the glass transition temperature of P1 being from 20 to 150° C., of P2 being from −10 to +40° C. and of P3 being from −10 to 70° C.

The term "glass transition temperature" is a theoretical value being the glass transition temperature as calculated by the method of Fox on the basis of monomer composition of the monomer charges M1, M2 and M3. According to T. G. Fox, Bull. Am. Phys. Soc. (Ser. II) 1, 123 (1056) and J. Brandrup, E. H. Immergut, Polymer Handbook $3^{rd}$ edition, John Wiley, New York, 1989.

Generally the polymer phases P1, P2 and P3 are composed of at least 80, such as at least 90% by weight of polymerizable ethylenically unsaturated monomers. Examples of such monomers are $C_1$ to $C_{10}$ esters of acrylic acid and $C_1$ to $C_4$ esters of (meth)acrylic acid. For example, the monomer charge M1 can comprise from 5 to 25% by weight of at least one monomer M1a selected from $C_1$ to $C_{10}$ esters of acrylic acid; from 75 to 95% by weight of at least one monomer M1b selected from $C_1$ to $C_4$ alkyl esters of methacrylic acid; and from 0 to 5% by weight of one or more ethylenically unsaturated monomers different from and polymerizable with the monomers M1a and M1b.

The monomer charge M2 can comprise from 60 to 90% by weight of at least one monomer M2a selected from $C_1$ to $C_{10}$ esters of acrylic acid; from 10 to 40% by weight of at least one monomer M2b selected from $C_1$ to $C_4$ alkyl esters of methacrylic acid; and from 0 to 5% by weight of one or more ethylenically unsaturated monomers different from and polymerizable with the monomers M2a and M2b.

The monomer charge M3 can comprise from 30 to 50% by weight of at least one monomer M3a selected from $C_1$ to $C_{10}$ esters of acrylic acid; from 50 to 70% by weight of at least one monomer M3b selected from $C_1$ to $C_4$ alkyl esters of methacrylic acid; and from 0 to 5% by weight of one or more ethylenically unsaturated monomers different from and polymerizable with the monomers M3a and M3b.

In the aqueous polymer dispersion of the invention, M1 typically comprises from 30 to 50% by weight; M2 comprises from 30 to 50% by weight; and M3 comprises from 10 to 30% by weight; the percentages by weight being based on total weight of M1, M2 and M3.

Examples of $C_1$ to $C_{10}$ alkyl esters of acrylic acid are methyl acrylate, ethyl acrylate, n-butyl acrylate and 2-ethylhexyl acrylate. Examples of $C_1$ to $C_4$ alkyl esters of methacrylic acid are methyl methacrylate, ethyl methacrylate and n-butyl methacrylate. Examples of different polymerizable ethylenically unsaturated monomers are vinyl aromatic compounds such as styrene and alpha-methyl styrene, hydroxyalkyl esters of (meth)acrylic acid such as hydroxyethyl (meth)acrylate and hydroxypropyl (meth)acrylate and acid functional monomers such as (meth)acrylic acid and maleic acid.

The dispersed polymeric particles typically have a particle size of 75 to 300, such as 170 to 250 nanometers (volume average) as determined by dynamic light scattering.

The aqueous polymer dispersions of the invention are prepared by free-radical aqueous emulsion polymerization of the monomer charges M1, M2 and M3 in the presence of at least one free-radical polymerization initiator, a chain transfer agent and, if desired, of a surface-active substance.

In this procedure, an aqueous polymer dispersion of the polymer P1 is first prepared by free-radical emulsion polymerization of the monomer charge M1 in an aqueous polymerization medium. An emulsion polymerization of the monomer charge M2 can then be conducted in the resulting dispersion of the polymer P1. A further emulsion polymerization of the monomer charge M3 is conducted in the resulting dispersion of the polymer phases of P1 and P2. This forms an aqueous polymer dispersion whose polymer particles contain polymer phases P1, P2 and P3. The aqueous polymerization medium generally contains less than 5% by weight of, usually less than 1% by weight of, water-miscible organic solvents. Typically, the monomer charge M1 is added simultaneously with free radical initiator and chain transfer agent to a heated mixture of water and dispersing agent. After holding at elevated temperature, the monomer charges M2 and M3 are added sequentially as generally shown in Example A. Alternatively, the aqueous dispersion of P1 is first prepared as described above and the monomer charge M2 can be added to swell the core followed by polymerization of M2 and the subsequent addition and polymerization of M3.

Suitable free-radical polymerization initiators are all those capable of triggering a free-radical aqueous emulsion polymerization. They may include both peroxides, e.g., alkali metal peroxodisulfates, and azo compounds. As polymerization initiators it is common to use what are known as redox initiators, which are composed of at least one organic reducing agent and at least one peroxide and/or hydroperoxide, e.g., tert-butyl hydroperoxide with sulfur compounds, e.g., the sodium salt of hydroxymethanesulfinic acid, sodium sulfite and sodium disulfite or hydrogen peroxide with ascorbic acid. The amount of free-radical initiator to be used is in the range of 0.1 to 0.5% by weight, such as 0.2 to 0.4% by weight, based on weight of M1, M2 and M3.

A chain transfer agent is used for adjusting the molecular weights of various polymer phases P1, P2 and P3. The polymerization chain transfer agent is not particularly restricted. Specific examples of the transfer agents are alkyl mercaptans such as hexyl mercaptan, octyl mercaptan, n-dodecyl mercaptan, t-dodecyl mercaptan, n-hexadecyl mercaptan, and n-tetradecyl mercaptan. The amount of the polymerization chain transfer agent to be used is generally in the range of 0.1 to 2% by weight based on weight of M2 and M3.

Surface active substances suitable for conducting the emulsion polymerization are protective colloids and emulsifiers that are normally used for emulsion polymerization. The surface active substances are typically used in amounts of up to 5%, such as 0.3 to 4% by weight, based on weight of M1, M2 and M3.

Examples of protective colloids are polyvinyl alcohol and vinyl pyrrolidone copolymers.

The emulsifier is not particularly restricted. Such emulsifiers as anionic emulsifiers, nonionic emulsifiers, and nonion-anionic emulsifiers may be used. Examples of anionic emulsifiers are fatty acid soaps, resin acid soaps, alkyl sulfonic acid soaps, dialkylaryl sulfonates, alkyl sulfosuccinates, and polyoxyethylene alkyl sulfates. Examples of nonionic emulsifiers are polyoxyethylene alkyl ethers, polyoxyethylene alkyl aryl ethers, polyoxyethylene sorbitan fatty acid esters, and oxyethylene oxypropylene block copolymers. These surface active agents may be used either singly or in combination.

The preparation of the polymer phase P1 can be carried out either as a batch process or in a continuous procedure. In continuous procedures, the major amount, i.e., at least 70%, such as at least 90%, of the monomers to be polymerized (in this case of the monomers M1) is supplied to the polymerization batch continuously, including by a stepped or gradient procedure, under polymerization conditions. In this context it has proven advantageous to supply the monomers M1 in the form of an aqueous monomer emulsion. In parallel with the addition of the monomers M1, the polymerization initiator and chain transfer agent are fed in. One possible procedure is to include a small portion, i.e., preferably not more than 10% by weight, of the monomers M1 to be polymerized in the initial charge to the polymerization reactor and to heat this initial charge to polymerization temperature. At the same time a portion of the polymerization initiator and chain transfer agent, generally from 0.5 to 20% by weight are added to the still-cold initial charge, or to the initial charge during heating, or to the initial charge which is at polymerization temperature. Subsequently, the remaining amounts of initiator and chain transfer agent are added continuously at the rate at which they are consumed.

The monomer charge M2 is added subsequent to the monomer charge M1; it is even possible to commence the addition of M2 when at least 30%, typically at least 90%, of the monomer charge M1 have already been supplied to the polymerization reactor. In parallel with the addition of the monomer charge M2, polymerization initiator and chain transfer agent are added at the rate at which they are consumed. Monomer charge M3 is then added in a similar manner. The monomer charge M3 is added subsequent to the monomer charge M2 in a manner similar to the addition of monomer charge M2.

The addition of the chain transfer agent can be made in parallel with the addition of the respective monomer charges. The chain transfer agent is typically dispersed in the respective monomer charge by, for example, being dissolved in the monomer phase.

In addition to the above-described process, the polymerization of the monomer phase M1 can also be conducted in the presence of a separately prepared seed latex. For the polymerization of monomer charge M1, the seed latex is included in the cold initial charge and, during or after heating to polymerization temperature, a certain amount of the polymerization initiator and chain transfer agent, generally from 1 to 20% of each, are added, and then the monomer charge M1 is supplied in the manner described above. The amount of seed latex used is generally in the range from 0.01 to 10% by weight, based on the overall amount of the monomers M1, M2 and M3 to be polymerized.

Suitable seed lattices are known from the prior art (Encyclopedia of Polymer Science and Technology, Vol. 5, John Wiley and Sons Inc., New York 1966). Typically a polystyrene seed will be used, since this is readily available.

The pressure and temperature of polymerization are of minor importance. In general, polymerization is conducted at temperatures between room temperature and 120° C., usually at temperatures of from 40 to 95° C.

Following the polymerization reaction, may be necessary to free the aqueous polymer dispersions of the invention from residual monomers and other volatile organic constituents. This can be done in a manner known per se physically, by distillative removal such as steam distillation or by stripping with an inert gas.

The aqueous polymer emulsions typically have a resin solids content of 50 to 65% by weight based on total weight of the emulsion. To increase the solids content, a fourth different polymeric base P4 can be included in the aqueous polymer dispersion. The glass transition temperature of P4 is at least −10, such as −10 to 40° C. The difference in the glass transition temperatures between P3 and P4 is at least 1° C., such as 1 to 20° C.

The monomer charge M4 comprises from 30 to 50% by weight of at least one monomer M4a selected from $C_1$ to $C_{10}$ esters of acrylic acid; from 50 to 70% by weight of at least one monomer M4b selected from $C_1$ to $C_4$ alkyl esters of methacrylic acid; and from 0 to 2% by weight of one or more ethylenically unsaturated monomers different from and polymerizable with the monomers M4a and M4b. The monomer charge M4 is added subsequent to the monomer charge M3 in a manner similar to the addition of monomer charge M3. Polymerization of the monomer charge M4 is in the presence of the dispersion of P1, P2 and P3 by emulsion polymerization techniques as described above but usually without a chain transfer agent.

In the aqueous polymer dispersion of the invention, M1 comprises from 30 to 50% by weight; M2 comprises from 30 to 50% by weight; M3 comprises from 10 to 30% by weight; and M4, when used, comprises from 10 to 30% by weight; the percentages by weight being based on total weight of M1, M2, M3 and M4.

The monomer charges M1, M2, M3 and M4 when used are preferably free of polyethylenically unsaturated monomers such as ethylene glycol dimethacrylate such that all of the monomer charges are composed of monoethylenically unsaturated monomers.

The aqueous polymeric dispersions are formulated with a filler material to form a sound damping coating composition. Suitable fillers include, without limitation, mica, talc, iron oxide, clay minerals, cellulose fibers, ferrite, calcium carbonate, calcium magnesium carbonate, barytes, ground natural or synthetic rubber, silica, aluminum hydroxide, alumina powder, titanium dioxide, and mixtures thereof.

On a solids basis, the aqueous polymeric dispersion provides 10 to 30, such as 20 to 25% solids to the coating composition, and the filler comprises from 50 to 80, such as 65 to 75% by weight solids to the coating composition. The percentages are by weight and based on total solids weight of the coating composition. Overall, the coating composition has a solids content of 75 to 90, such as 80 to 85, based on total weight of the coating composition, the remainder being volatiles such as water and organic solvent.

In certain embodiments, the coating composition of the present invention further comprises one or more polymeric materials chemically different from the polymeric particles discussed above. Useful polymeric materials include polyepoxides, polyurethanes, polyamides, polyesters, polyacrylates, polyvinyl chlorides, or mixtures thereof. In certain embodiments, these polymeric materials comprise a reactive functional group selected from the group comprising hydroxyl, carboxyl, carbamate, epoxy, isocyanate, aceto acetate, amine-salt, mercaptan, and combinations thereof. A specific example is a polyurethane diol such as described in U.S. Pat. No. 7,288,595. These additional polymeric materials can be used in amounts up to 10%, such as 2 to 5% by weight based on total solids weight of the coating composition. If a polymeric material comprises a reactive functional group, then the coating composition may also comprise a curing agent or crosslinking agent that is reactive with the reactive functional group of the polymeric material. Suitable crosslinking agents that may be used include, without limitation, aminoplasts, polyisocyanates (including blocked isocyanates), polyepoxides, beta-hydroxyalkylamides, polyacids, anhydrides, organometallic acid-functional materials, polyamines, polyamides, cyclic carbonates, siloxanes, or combinations thereof. Selection of the appropriate type of crosslinking agent will depend on the reactive functional groups of the polymeric material. The curing agent can be present in amounts up to 5%, such as 1 to 3% by weight based on total solids weight of the coating composition.

In some embodiments, a polyacrylate rheology modifier such as ACRONAL ASE 60 polyacrylate copolymer emulsion prepared from methyl acrylate, butyl acrylate, methyl methacrylate and methacrylic acid is included in the coating composition. The rheology modifier can be present in the coating composition in an amount up to about 5 weight percent, such as 0.5 to 2% by weight based on total solids weight of the coating composition.

Additionally, one or more plasticizers can be included in the coating composition. Suitable plasticizers that may be used include, without limitation, isobutyrates, adipates, benzoates, glutarates, isophthalates, phosphates, (poly)esters, sebacates, mellitates (e.g., trimellitate), azelate, citrate, sulfonamides, terephthalates, glycol, benzyl phthalate, or combinations thereof. The amount of plasticizer can be present in amounts up to 20%, such as 1 to 5% by weight, based on the total solids weight of the coating composition.

The coating composition of the present invention can also include a variety of other optional ingredients that are somewhat dependent on the particular application of the composition. These other optional ingredients include, without limitation, dyes or pigments, such as carbon black or graphite, silica, thixotropes, fiber glass reinforcements, surfactants, defoamers, corrosion inhibitors, diluents, blowing agents, antioxidants, expandable polymeric microspheres, glass beads, or combinations thereof. These other optional ingredients are generally present in an amount of up to about 5% by weight based on total solids weight of the coating composition.

The viscosity of the coating composition disclosed herein is application-specific. Accordingly, the user will factor in the type of equipment to be used to apply the coating composition, required film thickness as well as desired sag resistance. In some embodiments, the coating composition has a viscosity ranging from 60,000 op to 160,000 cp, such as from 70,000 op to 120,000 cp or 80,000 cp to 110,000 op, at 20 RPM reading on the Brookfield viscometer at ambient temperature (25° C.).

The coating composition described above can be prepared by mixing components in a high energy vacuum mixer, such as Dual Disperser Model HHL-2-1000 (commercially available from Hockmeyer). The components are mixed until they are substantially homogenous, which usually occurs within two to six hours. During this time, the material is kept below 32.2° C. This can be accomplished by surrounding the mixer with a cooling jacket which is known in the art. In certain embodiments, the vacuum is applied towards the end of the mixing operation to obtain a substantially air-free mixture.

The coating composition described above may be applied alone or as part of a coating system that can be deposited onto a number of different substrates. The coating system typically comprises a number of coating layers. A coating layer is typically formed when a coating composition that is deposited onto the substrate is substantially cured by methods known in the art (e.g., by thermal heating). It is noted that the coating composition described above can be used in one or more of the coating layers described in the following paragraphs.

Suitable substrates that can be coated with the coating composition comprising the polymer include, without limitation, metal substrates, metal alloy substrates, substrates that have been metallized, such as nickel plated plastic, and/or plastic substrates. In some embodiments, the metal or metal alloy can be aluminum and/or steel. For example, the steel substrate could be cold roiled steel, electrogalvanized steel, and/or hot dipped galvanized steel. Moreover, in some embodiments, the substrate may comprise a portion of a vehicle such as a vehicular body (e.g., without limitation, door, floor-pan, fire-wall, wheel, wheel-house, body panel, trunk deck lid, roof panel, hood, and/or roof) and/or a vehicular frame. As used herein, "vehicle" or variations thereof includes, but is not limited to civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989 or not pretreated with a pretreatment solution.

In a conventional coating system used in the automotive industry, a pretreated substrate is coated with an electrodepositable coating composition. The electrodepositable coating composition is then cured prior to application of subsequent coating compositions. In certain embodiments, the coating composition described above can be applied onto at least a portion of the cured electrodepositable coating composition. In other embodiments, however, the coating composition of the present invention may be applied to a substrate that lacks an electrodepositable coating layer. That is, the coating composition can be applied onto the surface of the substrate regardless of whether the substrate has been subjected to a pretreatment step or not. In the case where the substrate has not been pretreated, the coating composition of the present invention is applied directly to the surface of the substrate without any intervening coating layers purposefully deposited between the coating layer and the substrate.

The methods by which the coating composition can be applied onto the substrate are known in the art. For example, the coating composition described above can be deposited onto the substrate by spraying, extrusion, or by hand with a blade. In certain embodiments, the coating composition is applied onto a substrate at a wet film thickness ranging from 1 mm to 6 mm depending on the damping requirements of the user. Typically, a thicker film will result in higher damping properties. After application to the substrate, the coating composition can be air-dried or it can be subjected to a baking step, which can occur between a temperature ranging from 121° C., to 193° C. for a time period ranging from 5 minutes to 1 hour. In some embodiments, additional baking steps could be needed to accommodate specific paint system configurations. The dry film thickness of the coating layer can increase 0% to 300% from the applied wet film thickness depending on the speed of drying and the heat applied to the coating composition. After cure, the coating layer demonstrates a composite damping Loss Factor of at least 0.1 over a temperature range of at least 40° C. determined at a frequency of 200 Hz and over a temperature range of −10 to 65° C. Moreover, after the coating composition is cured, it is substantially free of defects.

In other embodiments, other coating compositions (topcoats) known in the art (e.g., basecoat coating compositions and/or clearcoat coating compositions) may be applied onto at least a portion of the coating composition described above. Since these topcoats are known in the art, the techniques of applying such coating compositions and the methods by which they are cured will not be discussed further since these variables will be dependent on the particular topcoat used.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

A series of aqueous polymeric dispersions were prepared with various amounts of chain transfer agents that were used in the preparation of the various polymeric phases, and for comparative purposes, without the use of the chain transfer agents.

Example A

An aqueous polymeric dispersion was prepared as follows. The dispersion consisted of polymeric phases P1, P2, P3 and P4 and was prepared using 0.25% by weight of monomer chain transfer agent in the polymerization of the monomer charges M1, M2 and M3. No chain transfer agent was used in the monomer charge M4.

TABLE 1

|     | Materials | Weight (grams) |
| --- | --- | --- |
| #1 | Deionized Water | 796.50 |
|     | Disponil AFX 4030[1] | 5.40 |
| #2 | 9% per-mix #5 | 75.81 |
|     | Deionized Water | 53.00 |
| #3 | Ammonium Persulfate | 0.50 |
|     | Deionized Water | 5.00 |
| #4 | Disponil FES 993[2] | 30.00 |
|     | Deionized Water | 7.50 |
| #5 | Methyl methacrylate | 555.90 |
|     | Methacrylic acid | 13.08 |
|     | 2-ethylhexyl acrylate | 85.02 |
|     | N-octyl mercaptan | 1.64 |
|     | Deionized Water | 127.50 |
|     | Disponil FES 993 | 15.00 |
|     | Disponil AFX 4030 | 15.00 |
| #6 | Ammonium Persulfate | 1.98 |
|     | Deionized Water | 64.00 |
| #7 | Methyl methacrylate | 196.20 |
|     | Methacrylic acid | 13.08 |
|     | 2-ethylhexyl acrylate | 444.72 |
|     | N-octyl mercaptan | 1.64 |
|     | Deionized Water | 90.00 |
|     | Disponil FES 993 | 45.00 |
| #8 | Ammonium Persulfate | 1.98 |
|     | Deionized Water | 48.00 |
| #9 | Methyl methacrylate | 193.82 |
|     | Methacrylic acid | 6.57 |
|     | 2-ethylhexyl acrylate | 128.12 |
|     | N-octyl mercaptan | 0.82 |
|     | Deionized Water | 90.00 |
|     | Disponil FES 993 | 60.00 |
| #10 | Ammonium Persulfate | 1.01 |
|     | Deionized Water | 32.00 |
| #11 | Methyl methacrylate | 173.25 |
|     | Methacrylic acid | 6.30 |
|     | 2-ethylhexyl acrylate | 135.45 |
|     | Disponil FES 993 | 30.00 |
|     | Deionized Water | 45.00 |
| #12 | Ammonium Persulfate | 1.44 |
|     | Deionized Water | 32.00 |
|     | Dimethyl ethyl amine | 15.00 |
|     | Deionized Water | 15.00 |

[1]Disponil AFX 4030 is a 30% active non-ionic ethoxylated polyol-type surfactant, available from BASF Corporation.
[2]Disponil FES 993 is a 30% active ionic alkyl ether sulfate C12-14, sodium salt surfactant, available from BASF Corporation.

1 in Table 1 was first charged into a four-necked round bottom 5 L flask fitted with a thermocouple, mechanical stirrer and condenser, and then heated up to 85° C. under $N_2$ blanket. Once the temperature reached 85° C., #2 was charged into the flask; after 5 minutes mixing, #3 was charged and then the mixture was held at 85° C. for 30 minutes. After 30 minutes holding, #4 was charged into the flask and then mixed for 5 minutes. After that, #5 and #6 were fed into the flask over 2 hours, and then the mixture was held for 30 minutes. After hold, #7 and #8 were fed into the flask over 1 hour, and then the mixture was held for 1 hour at 85° C., After 1-hour hold, #9 and #10 were fed into the flask over 1 hour, and then the mixture was held for 1 hour at 85° C. After that, #11 and #12 were fed into the flask over 1 hour, and then the mixture was held for 1 hour at 85° C. After 1-hour hold, the mixture was cooled to 70° C. and #13 was charged into the flask, and then the mixture was mixed for 15 minutes before being cooled to room temperature.

Example B

Comparative

An aqueous polymeric dispersion similar to Example A was prepared but using no chain transfer agent in the monomer charge M1.

Example C

Comparative

An aqueous polymeric dispersion similar to Example A was prepared but using no chain transfer agent in the monomer charges M2 and M3.

Example D

An aqueous polymeric dispersion similar to Example A was prepared but using 1.0% by weight of the chain transfer agent in the monomer charge M1 and 0.25% by weight of the chain transfer agent in the monomer charges M2 and M3.

Example E

An aqueous polymeric dispersion similar to Example A was prepared but using 1.0% by weight of the chain transfer agent in the monomer charge M1 and 0.25% by weight of the chain transfer agent in the monomer charges M2, and no chain transfer agent in the monomer charge M3.

Examples 1-4

The aqueous polymeric dispersions of Examples A-D were combined with various ingredients as shown in Table 2 below to form vibration damping compositions.

TABLE 2

| Ingredient | Example No. | | | | |
|---|---|---|---|---|---|
| | 1 | 2 | 3 | 4 | 5 |
| Example A | 63 | | | | |
| Example B | | 68.3 | | | |
| Example C | | | 63 | | |
| Example D | | | | 63 | |
| Example E | | | | | 63 |
| Propylene Glycol | 2 | 2 | 2 | 2 | 2 |
| 2,2,4-trimethyl pentanediol monoisobutyrate | 1 | 1 | 1 | 1 | 1 |
| Urethane Diol[1] | 4 | 4 | 4 | 4 | 4 |
| Idropon Logic 30[2] | 0.32 | 0.32 | 0.32 | 0.32 | 0.32 |
| BYK 32[3] | 0.2 | 0.2 | 0.2 | 0.2 | 0.2 |
| Raven 410[4] | 0.2 | 0.2 | 0.2 | 0.2 | 0.2 |
| Dolocron 4512[5] | 123.9 | 123.9 | 123.9 | 123.9 | 123.9 |
| Expansel 551 DU40[6] | 1.2 | 1.2 | 1.2 | 1.2 | 1.2 |

TABLE 2-continued

| Ingredient | Example No. | | | | |
|---|---|---|---|---|---|
| | 1 | 2 | 3 | 4 | 5 |
| HiSil T-800[7] | 1.8 | 1.8 | 1.8 | 1.8 | 1.8 |
| Acrysol ASE 60[8] | 1.5 | 1.3 | 1.3 | 1.3 | 1.3 |

[1]Reaction product of propylene carbonate and JEFFAMINE 400, prepared as in Example A of US 7,288,595.
[2]Sodium salt of a polycarboxylic acid,
[3]Defoamer from BYK Chemie.
[4]Carbon black from Phelps Dodge-Columbian Chemical.
[5]Filler, Calcium Magnesium Carbonate from Specialty Minerals.
[6]Expandable organic hollow beads from Expansel Inc.
[7]Precipitated silica from PPG Industries.
[8]Aqueous acrylic rheology modifier from Rohm & Haas Corp.

The weight average molecular weights of the dispersed polymers and the glass transition temperatures of P1, P2, P3 and P4 polymer phases are reported in Table 3 below.

The ingredients of each of the compositions shown in Table 2 above were mixed at low agitation in a container using an air-driven motor. The ingredients were added to the container in the order shown in Table 2, and the mixing speed was increased to maintain a vortex throughout the addition. Samples 2 mm thick were placed in a vacuum chamber equipped with an agitator and a vacuum of at least 700 mm Hg to the agitated sample. The sample was removed when foaming subsided (35 minutes).

Draw downs of 3-4 inch long samples using a 3-inch wide 120-mil thick coating template were prepared on electro-coated steel test panels. Each draw down was heated under the following conditions.

Allow the draw down panel to air dry at ambient temperature for 10 minutes and then place it in an oven that has been preset to 155° C. Remove the panel after 23 minutes and allow it to cool down at ambient temperature for 10 minutes. Then place the panel in an oven that has been preset to 150° C. Remove the panel after 18 minutes and allow it to cool down at ambient temperature for 10 minutes. Finally place the panel in an oven that has been preset to 140° C. Remove the panel after 30 minutes to complete the bake process.

Coating thickness was measured using a caliper and the % expansion from the initial 2 mm wet stop. The samples were evaluated for appearance and for vibration damping. The results are reported in Table 3 below.

The vibration damping of each coating was measured using the Oberst ASTM Test Method E756-93 ("Standard Test Method for Measuring Vibration-Damping Properties of Materials"), Sections 3 and 10. The principal measure of sound deadening in this test is loss factor, the ratio of loss modulus to storage modulus of the material. Oberst values typically range from 0.001 for uncoated steel (thickness 1 millimeter) (if the steel panel is struck, one would hear a "clang") to 0.01 ("bong") to 0.1 ("bunk") to 0.5 ("thud") for increasingly efficient coatings. The Oberst test measures the sound loss factor of the coating-substrate composite.

Each test sample was applied to an Oberst Bar, which is a metal bar formed from special on-hardening ground flat stock, AISI/SAE GRD 0-1, 1 mm thick, 10 mm wide from McMaster-Carr, and cured as described above. The weight of each cured coating over 210 mm coat length was 6.72+−.0.12 grams. The Oberst loss factor values were normalized to 672 grams for comparison. Composite damping loss factors were measured over a temperature range of −10 to 65° C. and at a frequency of 200 Hz. The temperature within the −10 to 65° C. range at which the composite damping loss factor was at least 0.1 is reported in Table 3 below.

TABLE 3

| Property | Example No. 1 | 2 | 3 | 4 | 5 |
|---|---|---|---|---|---|
| Mw | 106,404 | 168,675 | 89,736 | 75,535 | 122663 |
| P1 Tg | 75.2 | 75.2 | 75.2 | 75.2 | 75.2 |
| P2 Tg | −15.5 | −15.5 | −15.5 | −15.5 | −15.5 |
| P3 Tg | 23.9 | 23.9 | 23.9 | 23.9 | 23.9 |
| P4 Tg | 19.1 | 19.1 | 19.1 | 19.1 | 19.1 |
| Appearance | small cracks no blisters | delaminated | delaminated | no cracks no blisters | Large bubbles |
| Expansion | 68 | — | — | 76 | 94 |
| Temperature Range (° C.) for Oberst value of at least 0.1 | 40.6 | — | — | 40 | 50.6 |

The results summarized in Table 3 show the compositions of the invention Examples 1 and 4 have better appearance and vibration damping than the comparative Examples 2 and 3.

Whereas particular embodiments of this invention have been described above for purposes of illustration, it will be evident to those skilled in the art that numerous variations of the details of the present invention may be made without departing from the invention as defined in the appended claims.

What is claimed is:

1. An aqueous polymer dispersion for vibration damping comprising a film-forming polymer in the form of dispersed particles comprising a polymer phase P1 and different polymer phases P2 and P3; the polymer dispersion obtained by free radical emulsion polymerization comprising the following steps:
    (a) polymerization of a first monomer charge M1 to give a polymer phase P1 followed by
    (b) polymerization of a second monomer charge M2 in the presence of P1 to give a polymer phase P2,
    (c) polymerization of a third monomer charge M3 in the presence of P1 and P2 to give a polymer phase P3,
wherein the difference in glass transition temperatures between P1 and P2 is at least 20° C.; the difference in glass transition temperatures between P2 and P3 is at least 5° C. and a chain transfer agent is used in the polymerization of the monomer charges M1, M2 and M3.

2. The aqueous polymer dispersion of claim 1 wherein P1 has a glass transition temperature of −40 to 130° C. and P2 has a glass transition temperature of −40 to 130° C. and the difference in the glass transition temperatures between P1 and P2 is from 70 to 150° C.

3. The aqueous polymer dispersion of claim 2 wherein P3 has a glass transition temperature of −10 to 70° C. and the difference in the glass transition temperatures between P2 and P3 is from 5 to 50° C.

4. The aqueous polymer dispersion of claim 1 wherein the monomer charge M1 comprises from 5 to 25 percent by weight of at least one monomer M1a selected from $C_1$ to $C_{10}$ esters of acrylic acid; from 75 to 95 percent by weight of at least one monomer M1b selected from $C_1$ to $C_4$ alkyl esters of methacrylic acid; and from 0 to 5 percent by weight of one or more ethylenically unsaturated monomers different from and polymerizable with the monomers M1a and M1b.

5. The aqueous polymer dispersion of claim 1 wherein the monomer charge M2 comprises from 60 to 90 percent by weight of at least one monomer M2a selected from $C_1$ to $C_{10}$ esters of acrylic acid; from 10 to 40 percent by weight of at least one monomer M2b selected from $C_1$ to $C_4$ alkyl esters of methacrylic acid; and from 0 to 5 percent by weight of one or more ethylenically unsaturated monomers different from and polymerizable with the monomers M2a and M2b.

6. The aqueous polymer dispersion of claim 1 wherein the monomer charge M3 comprises from 30 to 50 percent by weight of at least one monomer M3a selected from $C_1$ to $C_{10}$ esters of acrylic acid; from 50 to 70 percent by weight of at least one monomer M3b selected from $C_1$ to $C_4$ alkyl esters of methacrylic acid; and from 0 to 5 percent by weight of one or more ethylenically unsaturated monomers different from and polymerizable with the monomers M3a and M3b.

7. The aqueous polymer dispersion of claim 1 wherein M1 comprises from 30 to 50 percent by weight; M2 comprises from 30 to 50 percent by weight; and M3 comprises from 10 to 30 percent by weight; the percentages by weight being based on total weight of M1, M2 and M3.

8. The aqueous polymer dispersion of claim 1 in which the chain transfer agent is a mercapto compound.

9. The aqueous polymer dispersion of claim 1 in which the chain transfer agent is present in amounts of 0.1 to 3 percent by weight based on the weight of monomers contained in the respective monomer charge.

10. The aqueous polymer dispersion of claim 1 that has a fourth polymer phase P4 which, after polymerization of the third monomer charge, a fourth monomer charge M4 is polymerized to give the polymer phase P4.

11. The aqueous polymer dispersion of claim 10 wherein the polymerization of monomer charge M4 is conducted in the absence of a chain transfer agent.

12. The aqueous polymer dispersion of claim 10 wherein the monomer charge M4 comprises from 30 to 50 percent by weight of at least one monomer M4a selected from $C_1$ to $C_{10}$ esters of acrylic acid; from 50 to 70 percent by weight of at least one monomer M4b selected from $C_1$ to $C_4$ alkyl esters of methacrylic acid; and from 0 to 2 percent by weight of one or more ethylenically unsaturated monomers different from and polymerizable with the monomers M4a and M4b.

13. The aqueous polymer dispersion of claim 10 wherein M1 comprises from 30 to 50 percent by weight; M2 comprises from 30 to 60 percent by weight; M3 comprises from 10 to 30 percent by weight; and M4 comprises from 10 to 30 percent by weight; the percentages by weight being based on total weight of M1, M2, M3 and M4.

* * * * *